(12) United States Patent
Namiki

(10) Patent No.: US 12,177,401 B2
(45) Date of Patent: Dec. 24, 2024

(54) IMAGE READING APPARATUS FOR READING AN IMAGE OF A MEDIUM

(71) Applicant: SEIKO EPSON CORPORATION, Tokyo (JP)

(72) Inventor: Masaki Namiki, Kitakyushu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/476,391

(22) Filed: Sep. 28, 2023

(65) Prior Publication Data

US 2024/0114101 A1 Apr. 4, 2024

(30) Foreign Application Priority Data

Sep. 29, 2022 (JP) .................................. 2022-155984

(51) Int. Cl.
```
H04N 1/04       (2006.01)
H04N 1/00       (2006.01)
H04N 1/028      (2006.01)
H04N 1/053      (2006.01)
H04N 1/12       (2006.01)
```
(52) U.S. Cl.
CPC ......... *H04N 1/028* (2013.01); *H04N 1/00557* (2013.01); *H04N 1/053* (2013.01); *H04N 1/1215* (2013.01); *H04N 2201/0081* (2013.01)

(58) Field of Classification Search
None
See application file for complete search history.

(56) References Cited

U.S. PATENT DOCUMENTS

| | | | |
|---|---|---|---|
| 2017/0126912 A1* | 5/2017 | Shuto | H04N 1/00618 |
| 2017/0267476 A1* | 9/2017 | Miyagi | B65H 1/02 |
| 2018/0173143 A1* | 6/2018 | Tanabe | G03G 15/0131 |
| 2018/0210392 A1* | 7/2018 | Yamana | G03G 15/5054 |
| 2018/0262646 A1* | 9/2018 | Gotoh | G06T 1/00 |
| 2020/0071100 A1* | 3/2020 | Namiki | B65H 7/02 |
| 2020/0177752 A1* | 6/2020 | Shiota | H04N 1/00702 |

FOREIGN PATENT DOCUMENTS

| | | | |
|---|---|---|---|
| JP | 4724288 B2 * | 7/2011 | |
| JP | 2020083621 A | 6/2020 | |

* cited by examiner

*Primary Examiner* — Dung D Tran
(74) *Attorney, Agent, or Firm* — CHIP LAW GROUP

(57) ABSTRACT

An image reading apparatus including an upper unit provided so as to be openable and closeable with respect to a lower unit, wherein the lower unit includes a two dimensional sensor that is disposed so as to face a medium fed from a medium support portion that supports the medium and detects movement of the medium in a two dimensional coordinate system, and a cover that switches a state in conjunction with opening and closing of the upper unit, exposes the two dimensional sensor in a state in which the upper unit is closed, and covers the two dimensional sensor in a state in which the upper unit is opened.

5 Claims, 13 Drawing Sheets

IMAGE READING APPARATUS FOR READING AN IMAGE OF A MEDIUM

The present application is based on, and claims priority from JP Application Serial Number 2022-155984, filed Sep. 29, 2022, the disclosure of which is hereby incorporated by reference herein in its entirety.

BACKGROUND

1. Technical Field

The present disclosure relates to an image reading apparatus that reads an image of a medium.

2. Related Art

JP 2020-83621 A discloses an image reading apparatus that detects skew of a medium using a two dimensional sensor.

In the image reading apparatus, a document transport path may be opened when a paper jam or the like occurs. In the state in which the document transport path is opened, dust or the like is likely to adhere to the two dimensional sensor during various operations by a user, and a detection defect is likely to occur.

SUMMARY

An image reading apparatus of the present disclosure for solving the above described problems includes a medium transport path through which a medium is transported, a reader configured to read a medium on the medium transport path, a lower unit forming a lower side of the medium transport path, and an upper unit being a unit forming an upper side of the medium transport path and provided so as to be openable and closeable with respect to the lower unit, wherein the lower unit includes a medium support portion that supports the medium before being fed, a two dimensional sensor that is disposed so as to face the medium fed from the medium support portion and detects movement of the medium in a two dimensional coordinate system including a first axis and a second axis, and a cover that switches a state in conjunction with opening and closing of the upper unit, and switches between a first state in which the two dimensional sensor is exposed in a state in which the upper unit is closed and a second state in which the two dimensional sensor is covered in a state in which the upper unit is opened.

DESCRIPTION OF EMBODIMENTS

Figure 1:
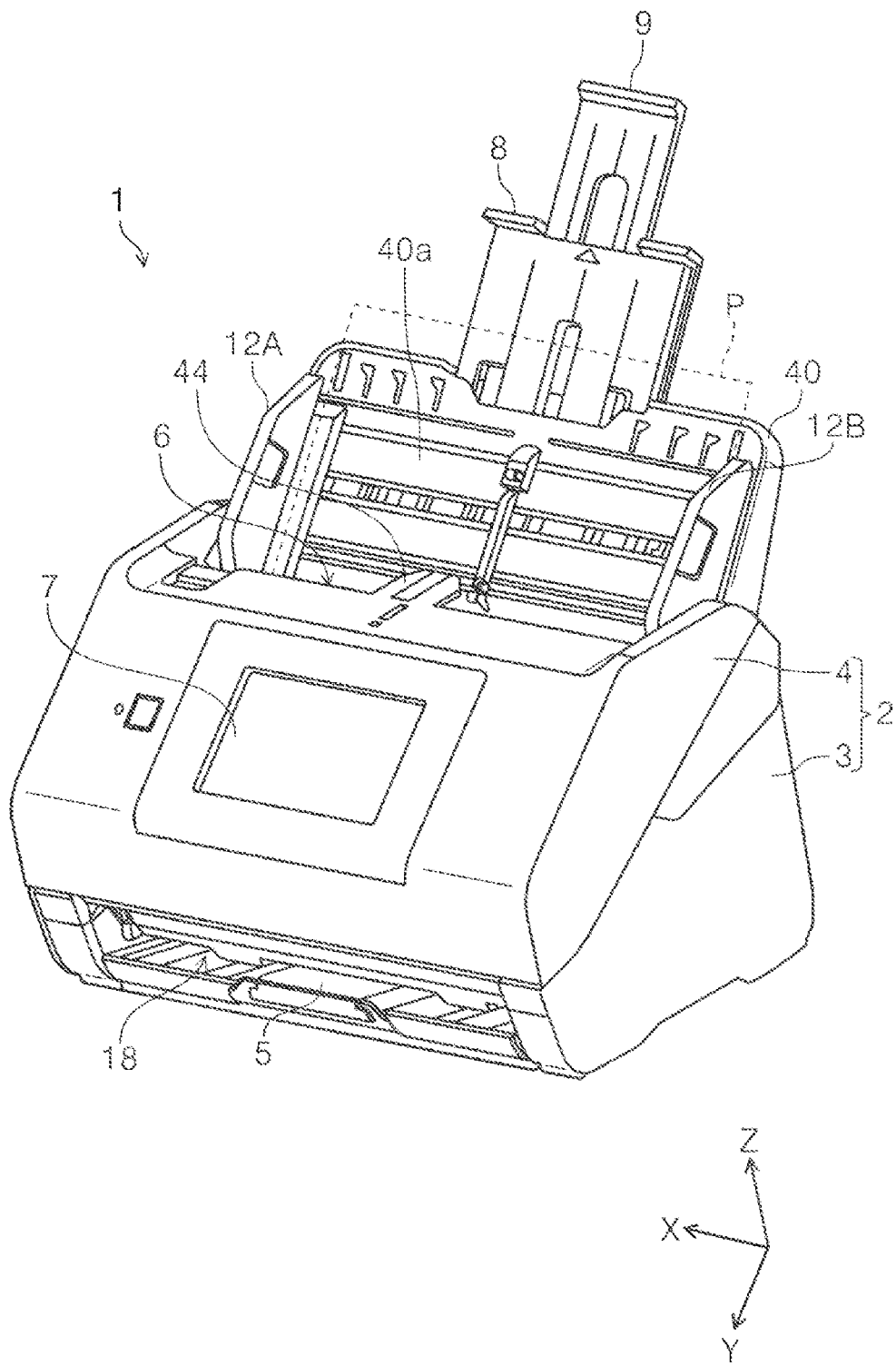
FIG. 1 is an external perspective view of a scanner.

Hereinafter, the present disclosure will be schematically described.

An image reading apparatus according to a first aspect includes a medium transport path through which a medium is transported, a reader configured to read a medium on the medium transport path, a lower unit forming a lower side of the medium transport path, and an upper unit being a unit forming an upper side of the medium transport path and provided so as to be openable and closeable with respect to the lower unit, wherein the lower unit includes a medium support portion that supports the medium before being fed, a two dimensional sensor that is disposed so as to face the medium fed from the medium support portion and detects movement of the medium in a two dimensional coordinate system including a first axis and a second axis, and a cover that switches a state in conjunction with opening and closing of the upper unit, and switches between a first state in which the two dimensional sensor is exposed in a state in which the upper unit is closed and a second state in which the two dimensional sensor is covered in a state in which the upper unit is opened.

According to the present aspect, the lower unit is provided with the cover that switches the states in conjunction with opening and closing of the upper unit and switches between the first state in which the two dimensional sensor is exposed in the state in which the upper unit is closed and the second state in which the two dimensional sensor is covered in the state in which the upper unit is opened, thus when the upper unit is opened to open the medium transport path, the two dimensional sensor is covered by the cover. Accordingly, when various operations are performed by a user in the state in which the medium transport path is opened, it is possible to suppress adhesion of dust or the like to the two dimensional sensor and to suppress a detection defect.

A second aspect is the first aspect, wherein the cover is provided so as to be slidable along a width direction intersecting a transport direction of the medium on a lower side of a support face on which the medium support portion supports the medium, slides in a first direction that is one way of the width direction to switch from the first state to the second state, and slides in a second direction that is another way of the width direction to switch from the second state to the first state.

According to the present aspect, the cover is provided so as to be slidable along the width direction intersecting the transport direction of the medium on the lower side of the support face on which the medium support portion supports the medium, thus the cover is unlikely to come into contact with the medium being fed, and it is possible to suppress inhibition of feeding of the medium.

In addition, the cover is configured to switch between the first state and the second state by sliding along the width direction intersecting the transport direction of the medium, thus it is possible to suppress a space required for the cover to switch the states, and to suppress an increase in size of the apparatus.

A third aspect is the second aspect, wherein the lower unit includes a cam member having a cam inclined surface configured to be engaged with the cover, the cam member being formed on an outside in the width direction of a transport region in which the medium is transported and on an outside in the second direction with respect to the transport region, the cam member is displaceable in a direction in which the cam member moves forward and backward with respect to the upper unit in the closed state and is pressed toward the upper unit, the upper unit includes a push-down portion that pushes down the cam member in the closed state, the cover is pressed toward the second direction, and in the state in which the upper unit is closed, the push-down portion pushes down the cam member to release the engagement between the cam inclined surface and the cover, the cover is pressed in the second direction to be brought into the first state, and when the upper unit is opened from the closed state, the cam member is raised so that the cam inclined surface presses the cover in the first direction, and switches the cover to the second state.

According to the present aspect, the configuration is adopted in which the cover performs state switching by operation of the cam member, thus it is possible to perform the state switching of the cover with simple structure.

A fourth aspect is the first aspect, wherein the cover is rotatably provided on a lower side of a support face on which the medium support portion supports the medium, and rotates to switch between the first state and the second state.

According to the present aspect, the cover is rotatably provided on the lower side of the support face on which the medium support portion supports the medium and rotates to switch between the first state and the second state, thus the cover is unlikely to come into contact with the medium being fed, and it is possible to suppress inhibition of feeding of the medium.

A fifth aspect is the fourth aspect, wherein the upper unit includes, on an outside of a transport region in which the medium is transported, a contact portion contactable with the cover, the cover is pressed toward the second state, and in a state in which the upper unit is closed, the contact portion comes into contact with the cover to bring the cover into the first state, and when the upper unit is opened from the closed state, engagement between the contact portion and the cover is released and the cover is switched to the second state.

According to the present aspect, the cover is configured to perform state switching by the engagement with the contact portion and the cancellation thereof, thus it is possible to perform the state switching of the cover with simple structure.

A sixth aspect is the first aspect, wherein the cover includes a cleaning member capable of cleaning a facing surface facing the medium in the two dimensional sensor, and the cleaning member cleans the facing surface in association with state switching of the cover.

According to the present aspect, the cover includes the cleaning member capable of cleaning the facing surface facing the medium in the two dimensional sensor, and the cleaning member cleans the facing surface in association with the state switching of the cover, it is possible to maintain performance of the two dimensional sensor independent of a hand of the user.

Note that the present aspect may be applied to any one of the second to fifth aspects without limiting to the first aspect.

A seventh aspect is the first aspect, wherein the upper unit includes a restricting portion that switches between a restricting state in which downstream movement in the transport direction of the medium supported by the medium support portion is restricted and a releasing state in which the restricting state is released, and a rotating member that is a member rotatable in association with state switching of the restricting portion, is brought into a facing state of facing the two dimensional sensor when the restricting portion is in the releasing state, and is brought into a separated state of being separated from the two dimensional sensor as compared to the facing state when the restricting portion is in the restricting state.

According to the present aspect, the configuration is adopted in which when the restricting portion is in the restricting state, that is, in a non-feeding state, the rotating member is brought into the separated state, and when the restricting portion is in the releasing state, that is, in a feedable state, the rotating member is brought into the facing state. Here, the rotating member faces the two dimensional sensor in the facing state, thus it is possible to suppress, by the rotating member, adhesion of dust or the like to the two dimensional sensor. In particular, since paper dust or the like easily adheres to the two dimensional sensor during feeding of the medium, it is possible to suppress this.

Here, when the rotating member remains in the facing state, the rotating member becomes an obstacle when the medium is set to the medium support portion, but when the restricting portion is in the restricting state, that is, in the non-feeding state, the rotating member is brought into the separated state, thus the rotating member is less likely to become an obstacle when the medium is set to the medium support portion, and handling properties are improved.

Note that the present aspect may be applied to any one of the second to sixth aspects without limiting to the first aspect.

Hereinafter, the present disclosure will be specifically described.

An exemplary embodiment of an image reading apparatus will be described below with reference to the drawings. In the present exemplary embodiment, as an example of the image reading apparatus, a document scanner (hereinafter, simply referred to as a scanner 1) capable of reading at least one surface of a front surface and a back surface of a document which is an example of a medium will be exemplified. Hereinafter, the document is denoted by a reference numeral P and is referred to as a document P.

Note that an XYZ coordinate system illustrated in each of the drawings is an orthogonal coordinate system, an X-axis direction is an apparatus width direction and is also a document width direction which is a direction intersecting a document transport direction. A left direction when seen from an apparatus front surface is a +X direction, and a right direction is a −X direction.

Additionally, a Y-axis direction is the document transport direction. Note that in the present exemplary embodiment, the Y-axis direction is a direction intersecting a horizontal plane.

A Z-axis direction is a direction intersecting the Y-axis direction, and substantially indicates a direction orthogonal to a surface of a document P being transported. A +Z direction is a direction including a vertically upward direction, and a −Z direction is a direction including a vertically downward direction.

Hereinafter, a direction in which the document P is fed (the +Y direction) may be referred to as "downstream", and a direction opposite thereto (the −Y direction) may be referred to as "upstream".

In FIG. 1, the scanner 1 includes an apparatus main body 2 including a reading unit 20 (see FIG. 2) that reads an image of the document P therein.

Figure 2:
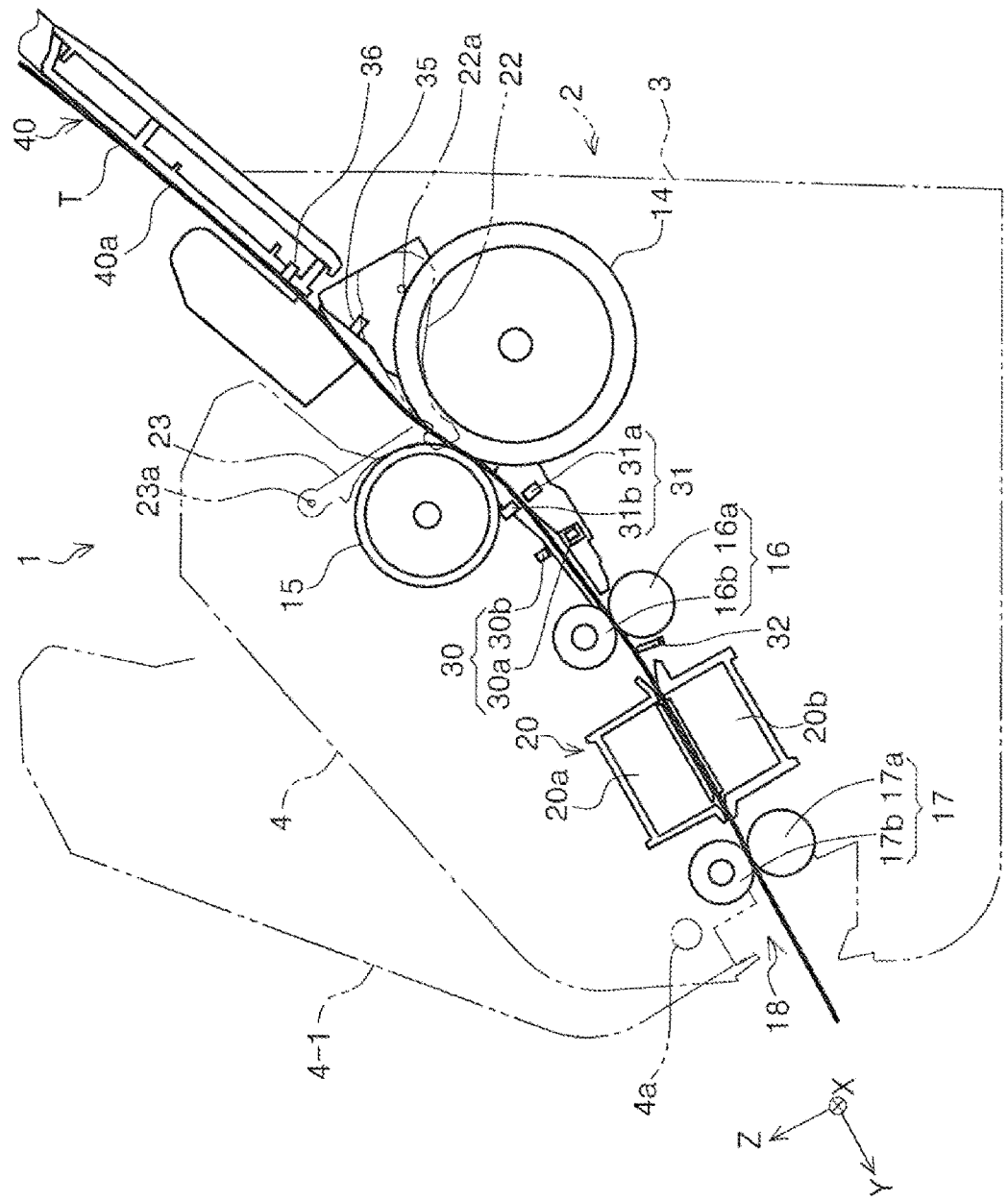
FIG. 2 is a diagram illustrating a document transport path in the scanner.

The apparatus main body 2 is configured to include a lower unit 3 and an upper unit 4. The upper unit 4 is provided so as to be openable and closable by rotating with respect to the lower unit 3 with a rotational movement shaft 4a (see FIG. 2) downstream in the document transport direction as a rotational fulcrum. In FIG. 2, a reference numeral 4-1 denotes the upper unit 4 in an opened state. The lower unit 3 forms a lower side of the document transport path, and the upper unit 4 forms an upper side of the document transport path. Since the document transport path is formed between the lower unit 3 and the upper unit 4, when the upper unit 4 is rotated in the apparatus front direction and is opened, the document transport path can be opened, and thus jam processing can be performed.

In FIG. 1, a document support portion 40 that supports the document P being fed is provided near an apparatus rear surface of the apparatus main body 2. The document support portion 40 includes a support face 40a that supports the document P. Further, the document support portion 40 is provided with a pair of edge guides that guide side edges in the width direction of the document P, specifically, a first edge guide 12A and a second edge guide 12B. The first edge guide 12A and the second edge guide 12B are displaced in a direction in which both come close to each other or in a direction in which both are separated away from each other by a rack and pinion mechanism (not illustrated).

The document support portion 40 includes a first paper support 8 and a second paper support 9. The first paper support 8 and the second paper support 9 are configured to be capable of being housed inside the document support portion 40 and capable of being pulled out from the document support portion 40 as illustrated in FIG. 1.

The apparatus main body 2 includes, at the apparatus front surface of the upper unit 4, an operation panel 7 which is a panel for performance of operations of various kinds of reading setting and performance of reading, and in which a user interface (UI) that displays reading setting contents and the like is realized. In the present exemplary embodiment, the operation panel 7 is a so-called touch panel that enables both display and input, and serves as both an operation unit for performance of various operations and a display unit for displaying various types of information.

A feeding port 6 communicating with an inside of the apparatus main body 2 is provided at an upper portion of the upper unit 4, and the document P supported by the document support portion 40 is fed from the feeding port 6 toward the reading unit 20 provided inside the apparatus main body 2.

Additionally, a paper discharge tray 5 for receiving the document P being discharged is provided at the apparatus front side of the lower unit 3.

Next, the document transport path in the scanner 1 will be described with reference to FIG. 2. FIG. 2 is a diagram briefly illustrating the document transport path in the scanner 1 according to the present disclosure. Note that the scanner 1 can be regarded as a document transport device that transports the document P from the viewpoint of omitting a function related to document reading, specifically, the reading unit 20 described later. Alternatively, even when the reading unit 20 is included, the scanner 1 itself can be regarded as a document transport device, focusing on document transport.

In FIG. 2, a solid line denoted by a reference numeral T indicates the document transport path, in other words, a passing track of the document P. A document transport path T is a space sandwiched between the lower unit 3 and the upper unit 4.

The document support portion 40 is provided on an uppermost stream side of the document transport path T, and a feed roller 14 that feeds the document P supported by the support face 40a of the document support portion 40 toward the reading unit 20 and a separation roller 15 that nips and separates the document P together with the feed roller 14 are provided downstream the document support portion 40.

The feed roller 14 comes into contact with the lowermost document P of the documents P supported by the support face 40a of the document support portion 40. Therefore, when the plurality of documents P are set on the document support portion 40 in the scanner 1, the documents P are sequentially fed downstream from the document P on the support face 40a side.

In the present exemplary embodiment, the two feed rollers 14 and the two separation rollers 15 are disposed so as to be symmetrical with respect to a center position in the document width direction.

The feed roller 14 is rotationally driven in a counterclockwise direction in FIG. 2 by obtaining rotational torque from a motor (not illustrated).

Rotational torque in the counterclockwise direction in FIG. 2 is transmitted to the separation roller 15 from a motor (not illustrated) via a torque limiter (not illustrated).

When no document P is interposed between the feed roller 14 and the separation roller 15, or when only one document is interposed, the separation roller 15 follows to rotate in a clockwise direction in FIG. 2 due to occurrence of slippage in the torque limiter (not illustrated).

When the second and subsequent documents P further enter between the feed roller 14 and the separation roller 15 in addition to the document P to be fed, slippage occurs between the documents, thus the separation roller 15 rotates in the counterclockwise direction in FIG. 2 due to the rotational torque received from the motor (not illustrated). Thus, multi-feeding of the documents P is prevented.

A transport roller pair 16, the reading unit 20 that reads an image, and a discharge roller pair 17 are provided downstream the feed roller 14. The transport roller pair 16 is configured to include a transport driving roller 16a that is rotationally driven by a motor (not illustrated) and a transport driven roller 16b that follows to rotate.

The document P, after nipped and fed downstream by the feed roller 14 and the separation roller 15, is nipped by the transport roller pair 16 and transported to the reading unit 20 positioned downstream the transport roller pair 16.

The reading unit 20 includes an upper reading sensor 20a provided on the upper unit 4 side and a lower reading sensor 20b provided on the lower unit 3 side. In the present exemplary embodiment, the upper reading sensor 20a and the lower reading sensor 20b are each configured as a contact image sensor module (CISM) as an example.

After an image on at least one surface of a front surface and a back surface of the document P is read in the reading unit 20, the document P is nipped by the discharge roller pair 17 positioned downstream the reading unit 20 and is discharged from a discharge port 18 provided on the apparatus front surface side of the lower unit 3.

The discharge roller pair 17 is configured to include a discharge driving roller 17a that is rotationally driven by a motor (not illustrated) and a discharge driven roller 17b that follows to rotate.

Next, each detector provided in the document transport path T will be described.

First, the document support portion 40 is provided with a two dimensional sensor 36. The two dimensional sensor 36 faces the lowermost document P of the documents P placed on the document support portion 40.

The two dimensional sensor 36 is a sensor based on the same or similar principle as that of a sensor capable of detecting movement of a detection target in a two dimensional (planar) coordinate system used for a computer mouse, and includes a controller, a light source, a lens and an image sensor (not illustrated).

The light source of the two dimensional sensor 36 is a light source for irradiating the document P placed on the document support portion 40 with light, and for example, a light source such as a red LED, an infrared LED, a laser or a blue LED can be employed. Light emitted from the light source is radiated toward the document P placed on the document support portion 40 via the lens. The radiated light is reflected by the document P, and the reflected light is received by the image sensor. As the image sensor, an image sensor such as a CMOS or a CCD can be used. In the image sensor, pixels are configured to be arranged along a first axis Ax direction and a second axis Ay direction orthogonal thereto. In the present exemplary embodiment, the first axis Ax direction is parallel to the X-axis direction, and the second axis Ay direction is parallel to the Y-axis direction.

The controller (not illustrated) analyzes an image acquired by the image sensor and outputs a movement distance Wx in the first axis Ax direction and a movement distance Wy in the second axis Ay direction of the image as detection values (output values).

Then, a control unit (not illustrated) that acquires detection values in the first axis Ax direction and the second axis Ay direction from the two dimensional sensor 36 uses the acquired detection values to determine a transport state of the document P which is the lowermost document P of the documents P placed on the document support portion 40 and is being fed, and particularly determines whether skew occurs or not.

Next, a document presence detection unit 35 for detecting whether the document P is present on the document support portion 40 or not is provided downstream the two dimensional sensor 36. The document presence detection unit 35 includes a light source and a sensor that receives a reflected light component of light emitted from the light source, and the control unit (not illustrated) can detect presence or absence of the document P on the document support portion 40 based on a difference in reflected light intensity between a case where the document P is present on the document support portion 40 and a case where the document P is not present on the document support portion 40.

A first document detection unit 31 is provided downstream the feed roller 14. The first document detection unit 31 is configured as an optical sensor as an example, and includes a light emitting unit 31a and a light receiving unit 31b which are disposed to face each other with the document transport path T interposed therebetween, the light receiving unit 31b transmits an electric signal indicating intensity of detection light to the control unit (not illustrated). When the transported document P blocks the detection light emitted from the light emitting unit 31a, the electric signal indicating the intensity of the detection light changes, and thus the control unit (not illustrated) can detect passage of a tip end or a trailing end of the document P.

A multi-feed detection unit 30 that detects multi-feed of the document P is disposed downstream the first document detection unit 31. As illustrated in FIG. 2, the multi-feed detection unit 30 is configured to include an ultrasonic transmitting unit 30a and an ultrasonic receiving unit 30b for receiving an ultrasonic wave that are disposed to face each other with the document transport path T interposed therebetween, and the ultrasonic receiving unit 30b transmits an output value corresponding to intensity of a detected ultrasonic wave to the control unit (not illustrated). When multi-feed of the document P occurs, an electric signal indicating the intensity of the ultrasonic wave changes, and thus the control unit (not illustrated) can detect the multi-feed of the document P.

A second document detection unit 32 is provided downstream the multi-feed detection unit 30. The second document detection unit 32 is configured as a contact type sensor having a lever, and when the lever rotates in association with passage of the tip end or the trailing end of the document P, an electric signal sent from the second document detection unit 32 to the control unit (not illustrated) changes, thus the control unit (not illustrated) can detect the passage of the tip end or the trailing end of the document P.

The control unit (not illustrated) can grasp a position of the document P in a document feeding path T by the first document detection unit 31 and the second document detection unit 32 described above.

Next, a cover that switches between a first state in which the two dimensional sensor 36 is exposed and a second state in which the two dimensional sensor 36 is covered will be described with reference to FIG. 3 and subsequent figures.

Figure 3:
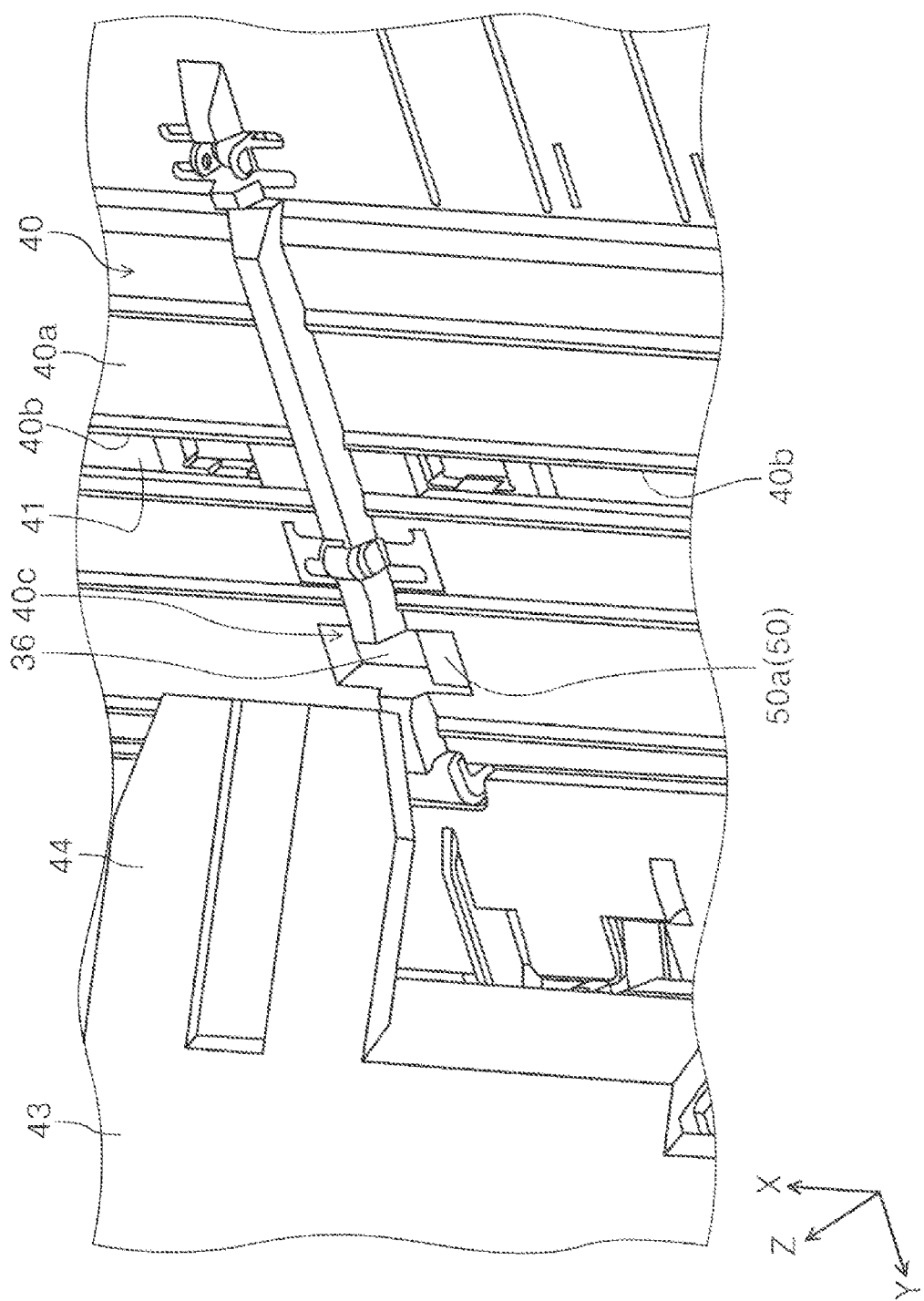
FIG. 3 is a perspective view illustrating a second state in which a cover covers a two dimensional sensor.
Figure 4:
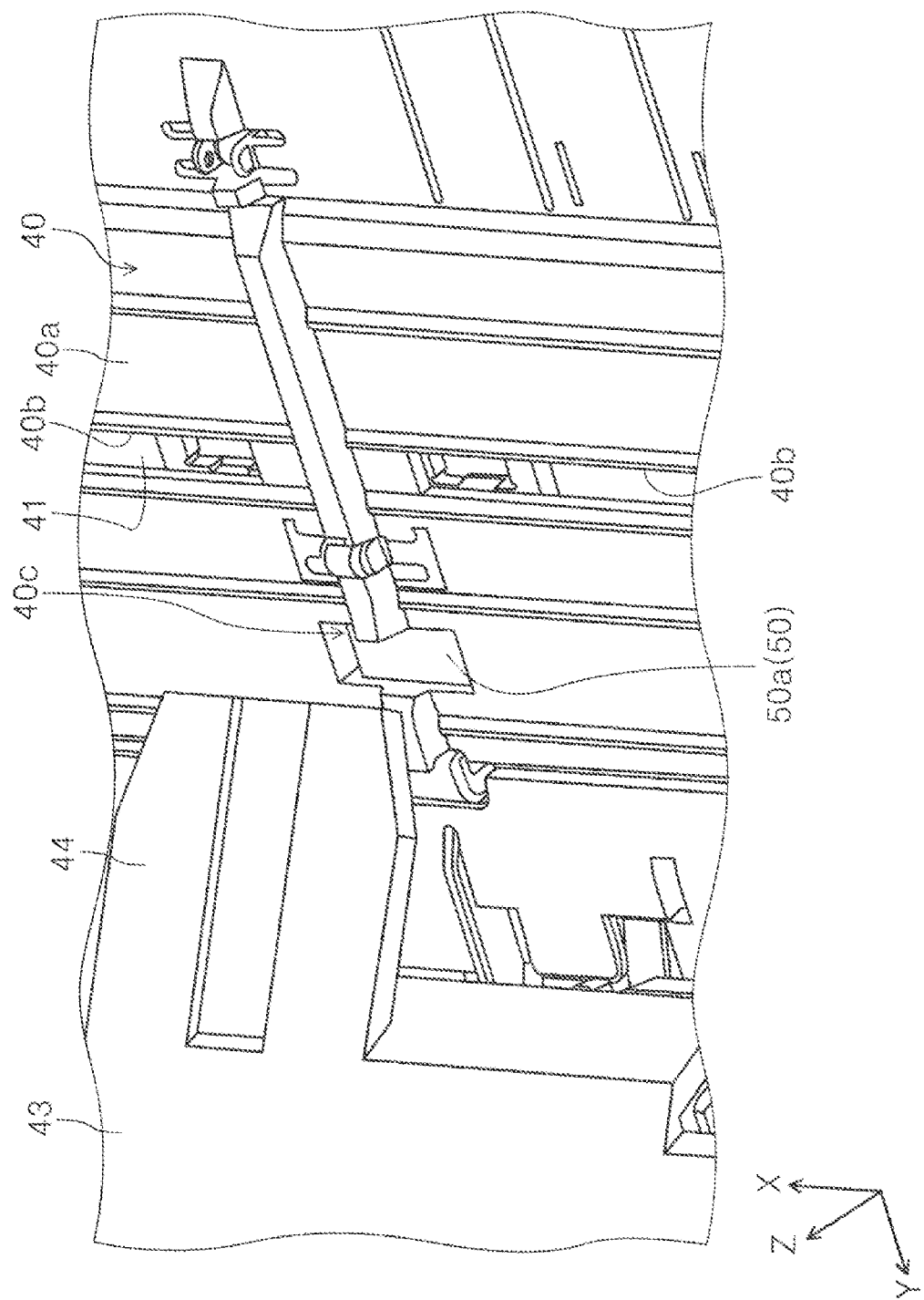
FIG. 4 is a perspective view illustrating a first state in which the cover exposes the two dimensional sensor.

As illustrated in FIG. 3, the document support portion 40 is formed with guide holes 40b and 40b extending in the X-axis direction. The guide holes 40b and 40b are holes for guiding the edge guides 12A and 12B described above. Inside the guide hole 40b, a part of a base member 41 provided on a lower side of the document support portion 40 is exposed.

In the +Y direction from the guide holes 40b and 40b, a rectangular opening portion 40c is formed at a position to be a center of the document P in the X-axis direction. The two dimensional sensor 36 is provided so as to be exposed to an inside of the opening portion 40c.

Figure 5:
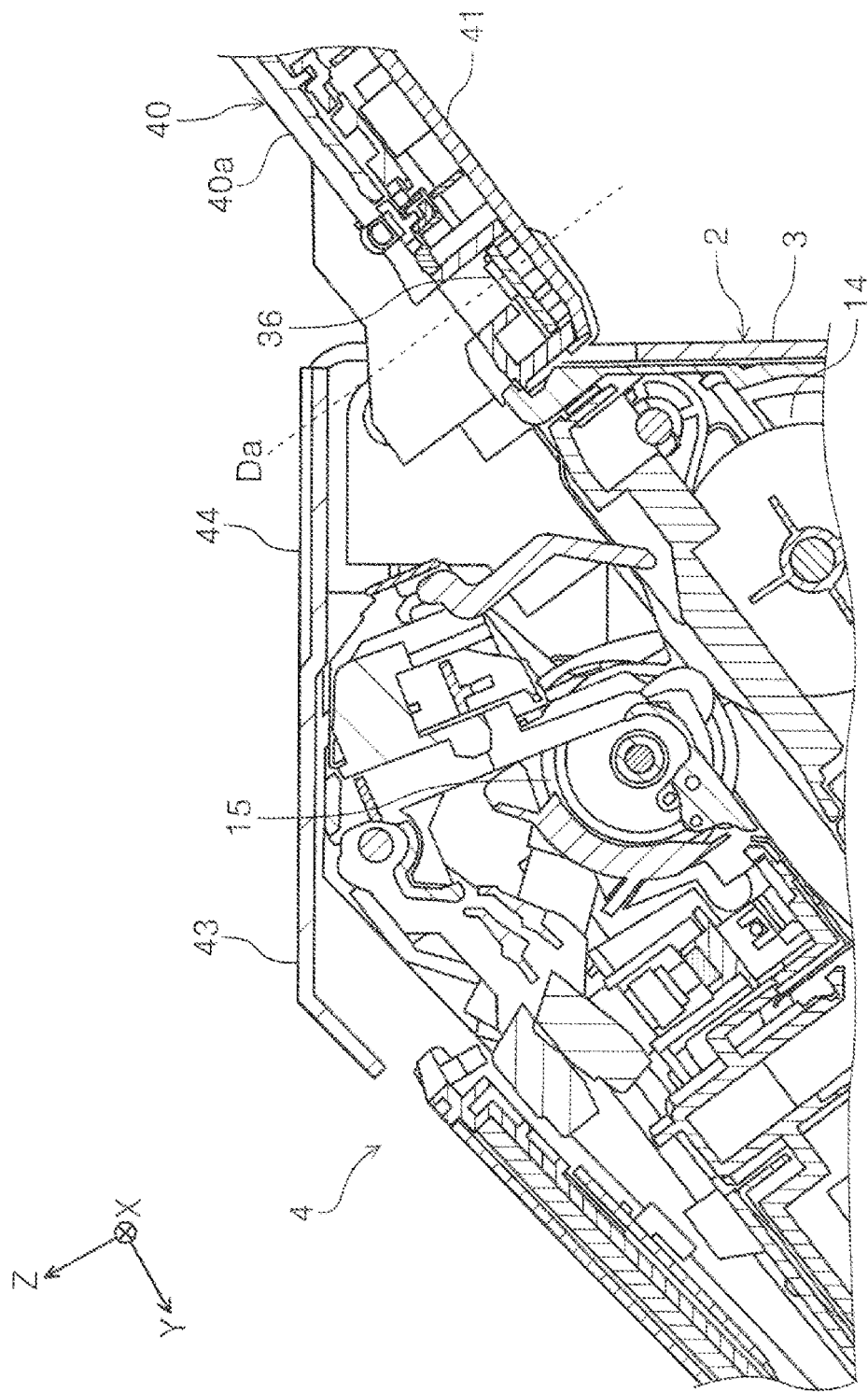
FIG. 5 is a cross-sectional view obtained by cutting an apparatus upper portion at a position of the two dimensional sensor, and is a diagram of a state in which an upper unit is closed.
Figure 6:
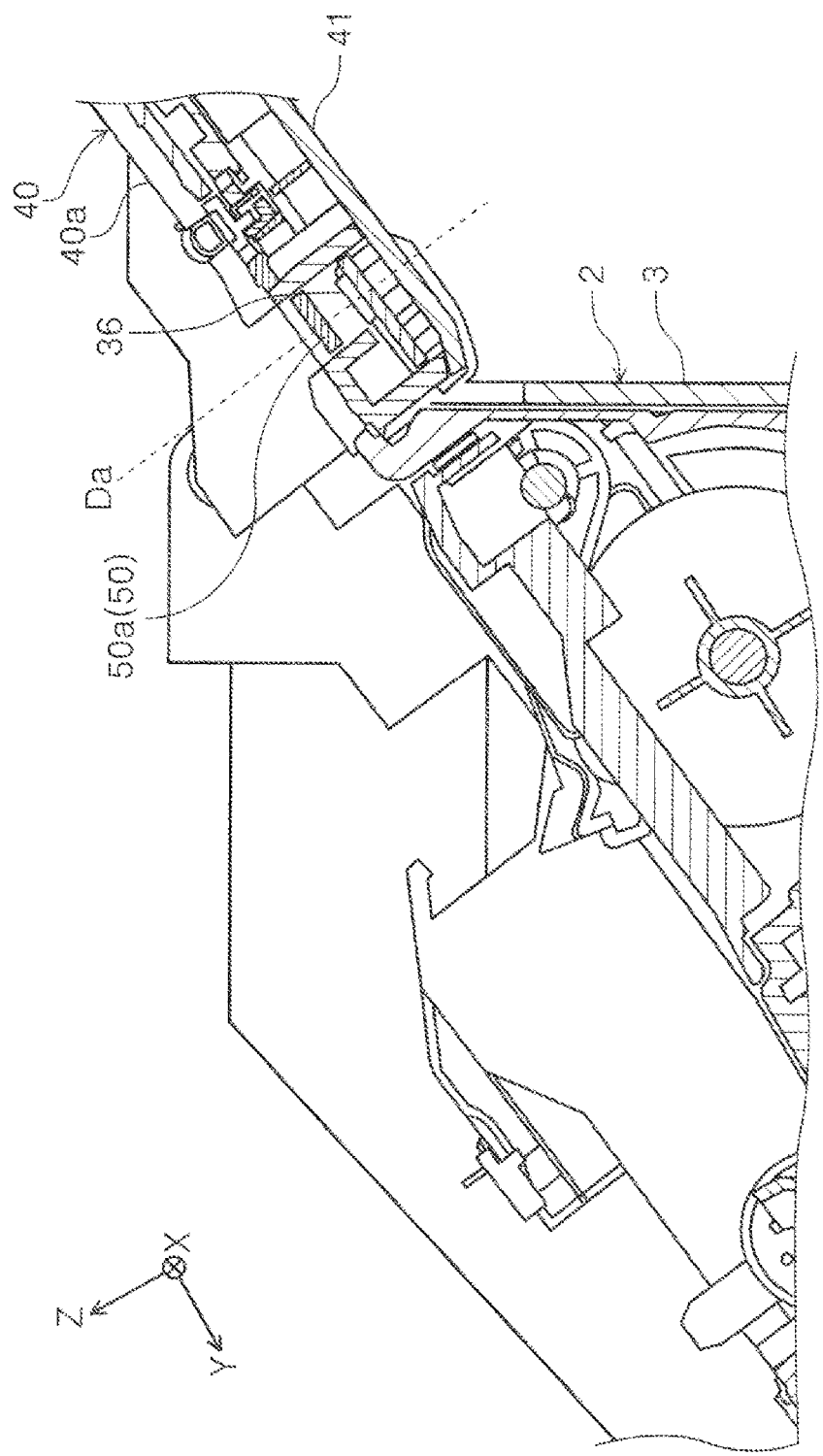
FIG. 6 is a cross-sectional view obtained by cutting the apparatus upper portion at the position of the two dimensional sensor, and is a diagram of a state in which the upper unit is opened.

A reference numeral 43 denotes an upper housing constituting an outer appearance of the upper unit 4, and an eaves portion 44 protruding toward the document support portion 40 is integrally formed at the upper housing 43. The eaves portion 44 is provided at the position to be the center of the document P in the X-axis direction, and is provided at a position facing the two dimensional sensor 36 in a state in which the upper unit 4 is closed as illustrated in FIG. 5. In FIG. 5, a broken line Da indicates an optical axis of detection light emitted by the two dimensional sensor 36, and an optical axis Da is provided so as to intersect the eaves portion 44. Adhesion of dust or the like to the two dimensional sensor 36 is suppressed by such an eaves portion 44. Since the eaves portion 44 is provided at the upper unit 4, when the upper unit 4 is opened for performing jam processing or the like, the state in which the two dimensional sensor 36 is covered by the eaves portion 44 is canceled as illustrated in FIG. 6.

Figure 7:
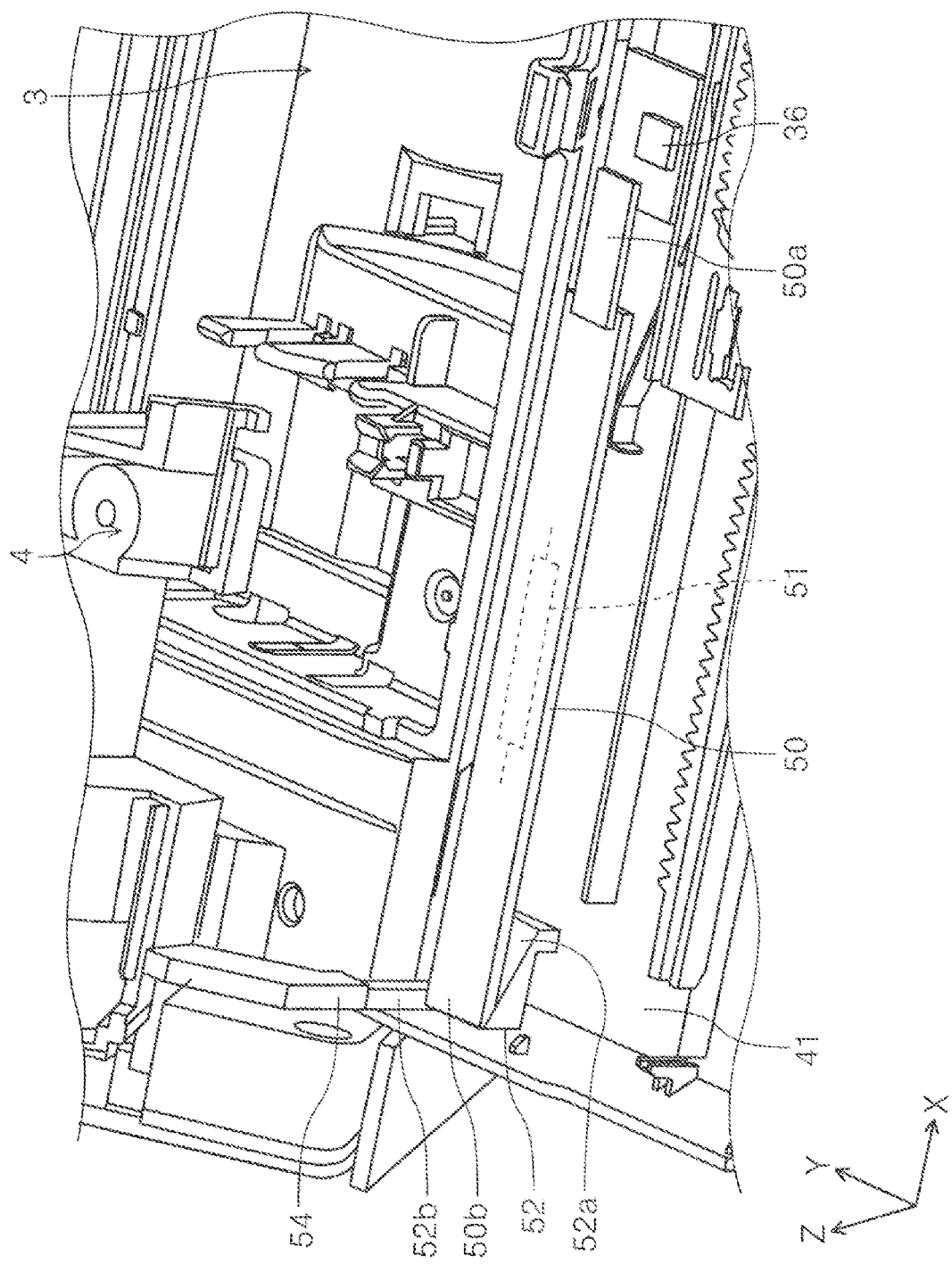
FIG. 7 is a perspective view of the cover and the two dimensional sensor, and is a perspective view illustrating the first state in which the upper unit is closed and the cover exposes the two dimensional sensor.
Figure 8:
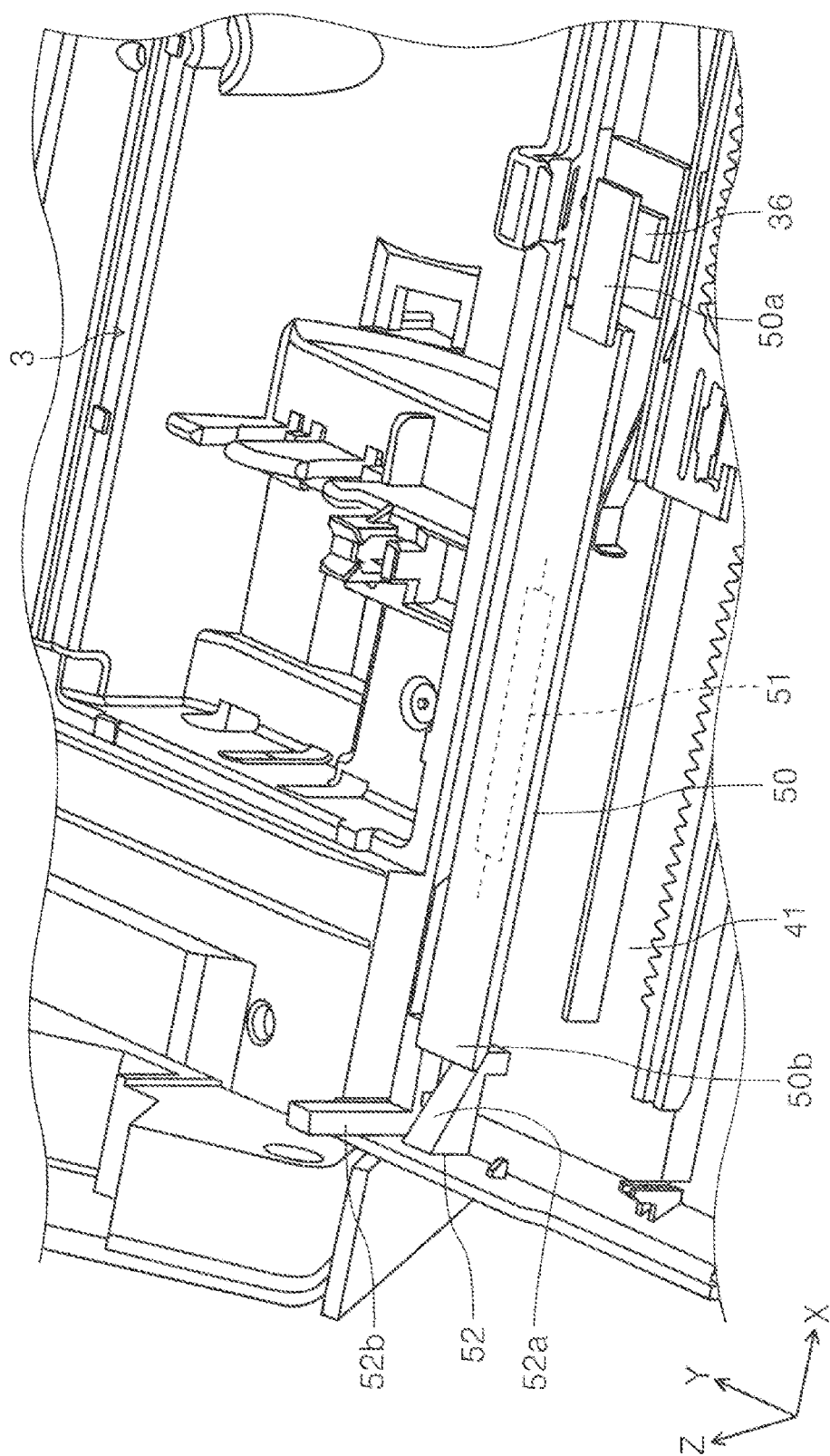
FIG. 8 is a perspective view of the cover and the two dimensional sensor, and is a perspective view illustrating the second state in which the upper unit is opened and the cover covers the two dimensional sensor.

A cover 50 is provided on a lower side of the document support portion 40 and on an upper side of the base member 41. In FIGS. 7 and 8, in order to clearly illustrate an installation state of the cover 50, a document support portion 11 is not illustrated, and the upper housing 43 constituting the outer appearance of the upper unit 4 is also not illustrated. In addition, members forming the document transport path T downstream the document support portion 40 are also not illustrated.

The cover 50 according to the present exemplary embodiment is provided so as to be slidable in the X-axis direction by a guider (not illustrated in FIGS. 7 and 8).

The cover 50 is a plate-like member extended along the X-axis direction. In the X-axis direction, the +X direction is an example of a first direction, and when an end portion in the +X direction is a tip end side, the cover 50 has a tip end portion 50a on the tip end side. In addition, in the X-axis direction, the –X direction is an example of a second direction, and when an end portion in the –X direction is a base end side, the cover 50 has a base end portion 50b on the base end side. The tip end portion 50a has a shape in which a width (length in the Y-axis direction) is slightly small and a thickness (length in the Z-axis direction) is slightly small as compared to the base end portion 50b.

A tension spring 51, which is an example of an elastic member, is provided on a lower side of the cover 50. An end portion of the tension spring 51 in the –X direction is hooked on a spring hook portion (not illustrated) formed at the base member 41, and an end portion of the tension spring 51 in the +X direction is hooked on a spring hook portion (not illustrated) formed at the cover 50. As a result, the cover 50 is brought into a state of being pressed in the –X direction, that is, a state of being pressed in a direction in which the cover 50 retracts from the two dimensional sensor 36.

The lower unit 3 is provided with a cam member 52 on an outside of a document transport region in the X-axis direction. The cam member 52 can be displaced in the Z-axis direction by a guider (not illustrated), and is pressed in the +Z direction, that is, in a direction toward the upper unit 4 by a pressing member (not illustrated) such as a compression coil spring.

A cam inclined surface 52a is formed at the cam member 52. The cam inclined surface 52a is an inclined surface that is engaged with the base end portion 50b of the cover 50. When the cam member 52 is displaced in the +Z direction, that is, in the direction toward the upper unit 4, the cam inclined surface 52a functions so as to push away the base end portion 50b, that is, the cover 50 in the +X direction.

The cam member 52 is formed with a rod portion 52b that protrudes in the +Z direction, that is, in the direction toward the upper unit 4.

The upper unit 4 is provided with a push-down portion 54 on the outside of the document transport region in the X-axis direction. The push-down portion 54 is provided at a position where contact with the rod portion 52b is possible, and pushes down the rod portion 52b, that is, the cam member 52 as illustrated in FIG. 7 in a state where the upper unit 4 is closed. In this state, the cam inclined surface 52a of the cam member 52 does not push away the cover 50 in the +X direction, and the cover 50 is brought into the first state in which the tip end portion 50a exposes the two dimensional sensor 36.

When the upper unit 4 is opened from the state illustrated in FIG. 7, the push-down of the rod portion 52b, that is, the cam member 52 by the push-down portion 54 is canceled as illustrated in FIG. 8, and the cam member 52 is displaced in the +Z direction. Due to the displacement of the cam member 52 in the +Z direction, the cam inclined surface 52a of the cam member 52 pushes away the cover 50 in the +X direction. As a result, the cover 50 is brought into the second state in which the tip end portion 50a covers the two dimensional sensor 36.

When the upper unit 4 is closed from this state, the push-down portion 54 pushes down the rod portion 52b, that is, the cam member 52, and the state illustrated in FIG. 7 is resumed.

As described above, the lower unit 3 is provided with the cover 50 that switches the states in conjunction with opening and closing of the upper unit 4 and switches between the first state in which the two dimensional sensor 36 is exposed in the state in which the upper unit 4 is closed and the second state in which the two dimensional sensor 36 is covered in a state in which the upper unit 4 is opened. Accordingly, when the upper unit 4 is opened for opening the document transport path T, the two dimensional sensor 36 is covered by the cover 50. Accordingly, when various operations are performed by a user in the state in which the document transport path T is opened, it is possible to suppress adhesion of dust or the like to the two dimensional sensor 36 and to suppress a detection defect.

Further, in the present exemplary embodiment, the cover 50 is provided so as to be slidable along the X-axis direction, that is, the width direction on a lower side (the –Z direction) of the support face 40a on which the document support portion 40 supports the document P, and is configured to slide in the first direction (+X direction) that is one way of the width direction to be switched to the second state from the first state, and to slide in the second direction (–X direction) that is another way of the width direction to be switched to the first state from the second state.

As described above, since the cover 50 is provided so as to be slidable on the lower side of the support face 40a on which the document support portion 40 supports the document P, the cover 50 is unlikely to come into contact with the document P being fed, and it is possible to suppress inhibition of feeding of the document P.

In addition, since the cover 50 is configured to switch between the first state and the second state by sliding along the width direction, it is possible to suppress a space required for the cover 50 to switch the states, and to suppress an increase in size of the apparatus.

In addition, in the present exemplary embodiment, the lower unit 3 includes the cam member 52, in which the cam inclined surface 52a capable of being engaged with the cover 50, is formed on the outside in the width direction of the transport region in which the document P is transported and on the outside in the second direction (–X direction) with respect to the transport region. The cam member 52 is displaceable in a direction in which the cam member 52 moves forward and backward with respect to the upper unit 4 in the closed state, and is pressed toward the upper unit 4. The upper unit 4 includes the push-down portion 54 that pushes down the cam member 52 in the closed state. The cover 50 is pressed toward the second direction (−X direction), and in the state where the upper unit 4 is closed, the push-down portion pushes down the cam member 52, so that the engagement between the cam inclined surface 52a and the cover 50 is released, and the cover 50 is pressed in the second direction (−X direction) to be brought into the first state. When the upper unit 4 is opened from the closed state, the cam member 52 is raised so that the cam inclined surface 52a pushes the cover 50 in the first direction (+X direction) and the cover 50 is switched to the second state. Since the cover 50 is configured to perform state switching by the operation of the cam member 52 as described above, the state switching of the cover 50 can be performed with simple structure.

Figure 9:
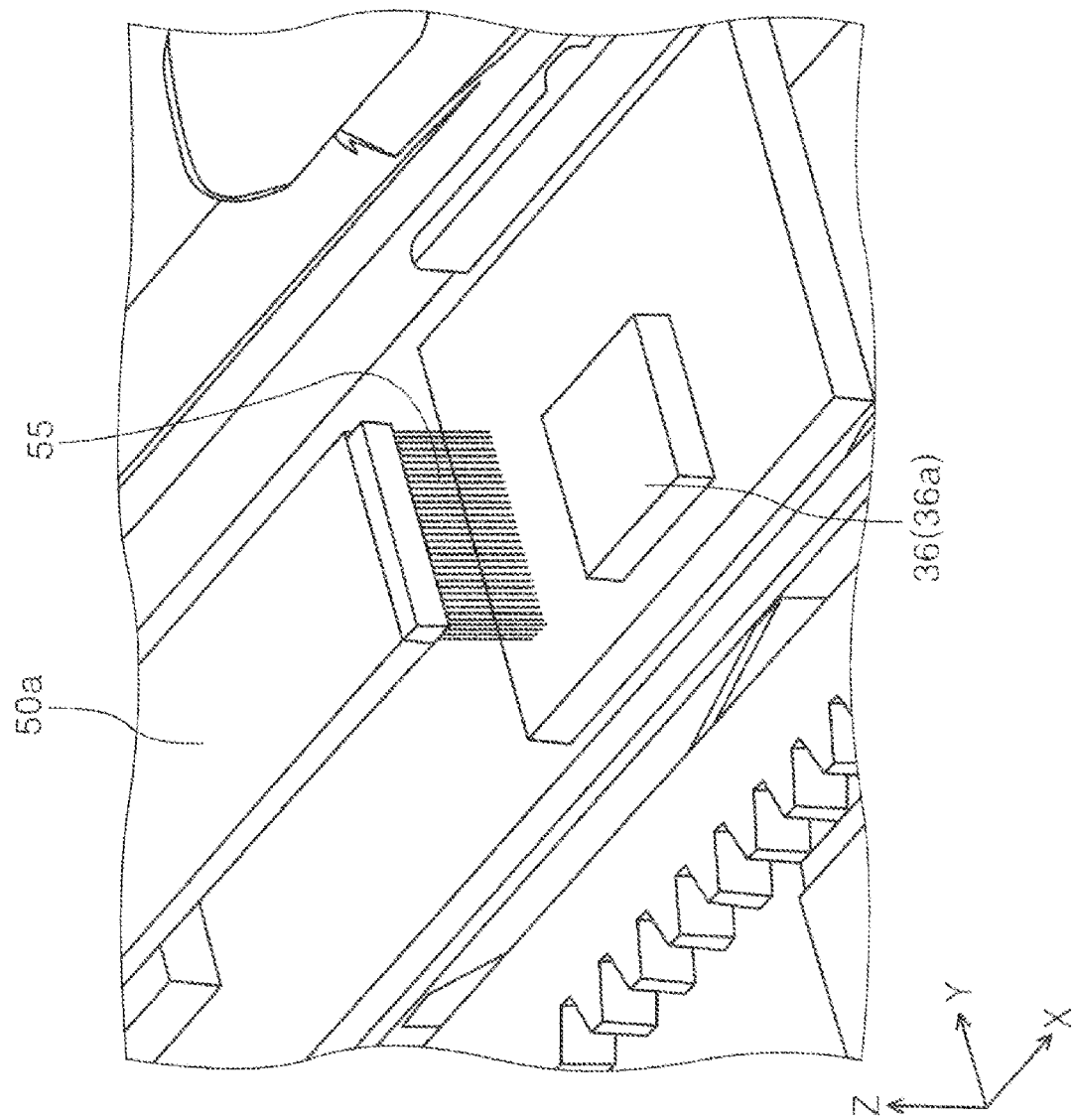
FIG. 9 is a diagram illustrating a modification of the cover.

Note that as illustrated in FIG. 9, a brush 55 may be provided at the tip end portion 50a of the cover 50. The brush 55 is an example of a cleaning member. The brush 55 can clean a facing surface 36a facing the document P in the two dimensional sensor 36. That is, the brush 55 cleans the facing surface 36a in association with the state switching of the cover 50. With this configuration, performance of the two dimensional sensor 36 can be maintained independent of a hand of the user.

Note that a transparent cover may be provided at an upper portion of the two dimensional sensor 36. In this case, the brush 55 may clean the transparent cover.

Figure 10:
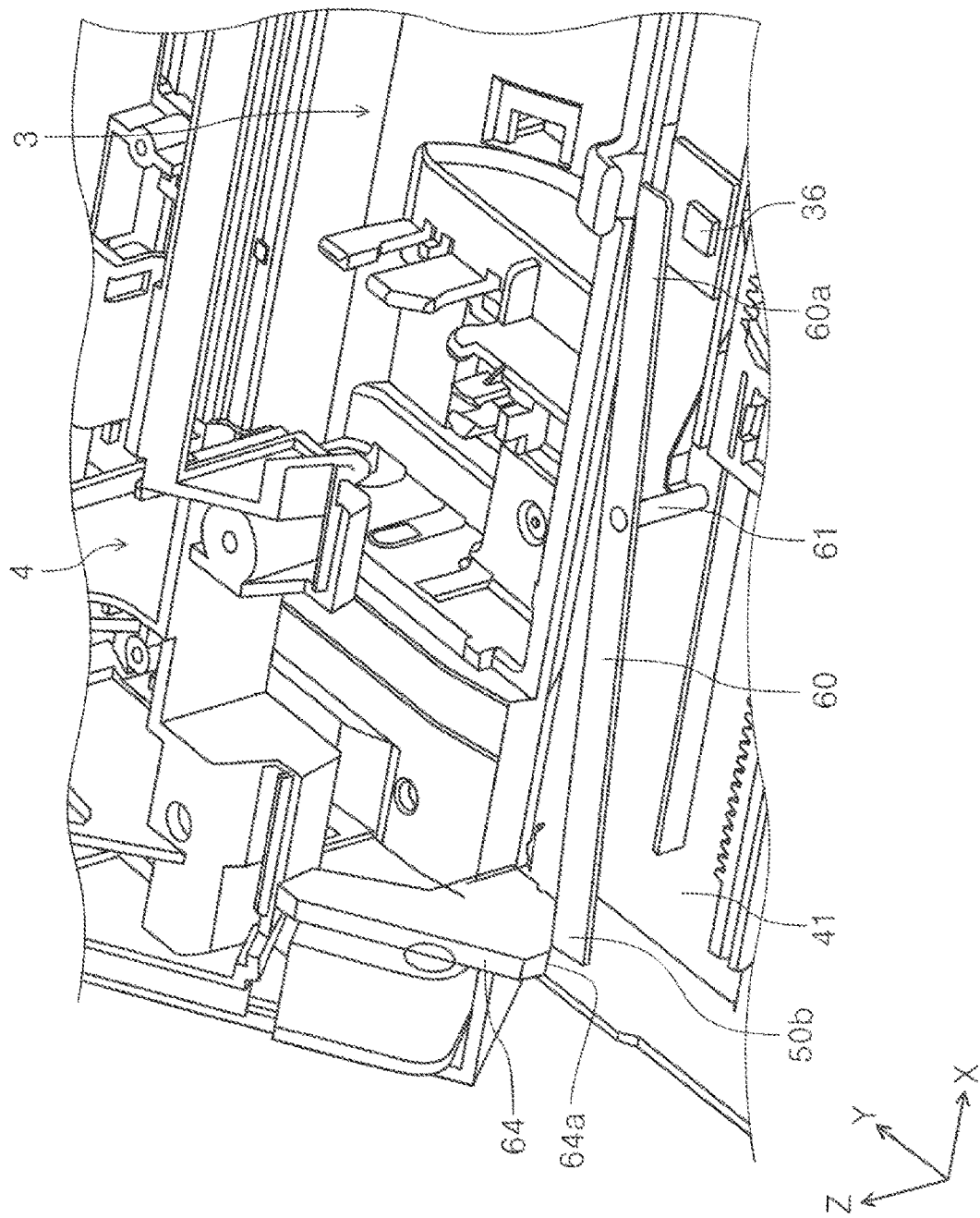
FIG. 10 is a perspective view of a cover and a two dimensional sensor according to another exemplary embodiment, and is a perspective view illustrating a first state in which an upper unit is closed and the cover exposes the two dimensional sensor.
Figure 11:
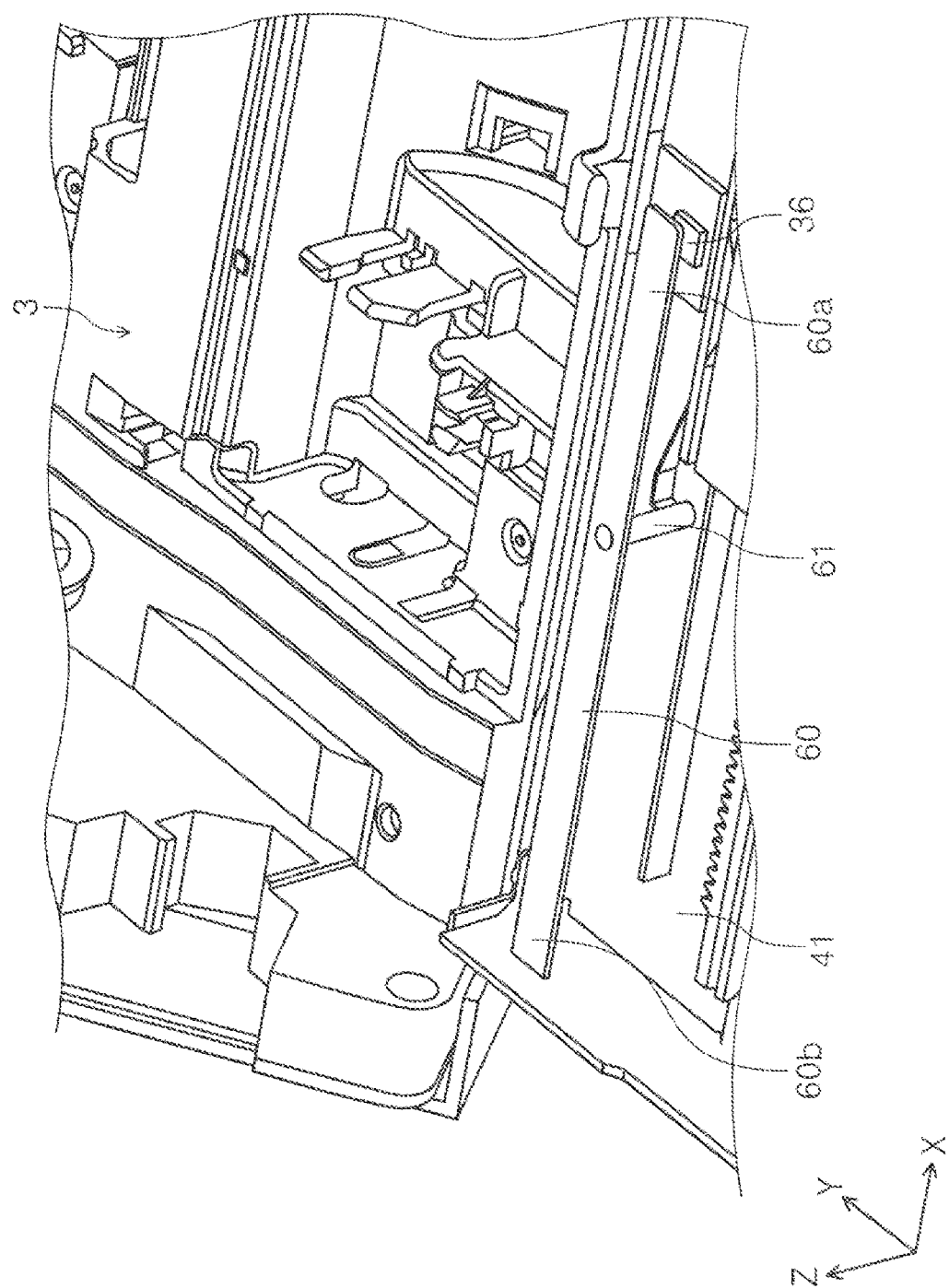
FIG. 11 is a perspective view of the cover and the two dimensional sensor according to the other exemplary embodiment, and is a perspective view illustrating a second state in which the upper unit is opened and the cover covers the two dimensional sensor.

Next, another exemplary embodiment of the cover will be described with reference to FIGS. 10 and 11. A cover 60 illustrated in FIG. 10 is provided so as to be rotatable about a rotary shaft 61 on a lower side of the support face 40a on which the document support portion 40 supports the document P. The rotary shaft 61 is a shaft having a shaft center line along the Z-axis direction and is provided at the base member 41. The cover 50 rotates to switch between a first state (FIG. 10) in which the two dimensional sensor 36 is exposed and a second state (FIG. 11) in which the two dimensional sensor 36 is covered.

The cover 60 includes a tip end portion 60a at a tip end in the +X direction, and the tip portion 60a covers the two dimensional sensor 36. In addition, the cover 60 includes a base end portion 60b at a tip end in the −X direction.

The cover 60 is substantially parallel to the X-axis direction in the second state (FIG. 11) in which the two dimensional sensor 36 is covered. In the first state (FIG. 10) in which the two dimensional sensor 36 is exposed, the tip end portion 60a of the cover 60 is retracted in the +Y direction with respect to the two dimensional sensor 36.

The cover 60 is pressed toward the second state (FIG. 11) in which the two dimensional sensor 36 is covered by a pressing member (not illustrated), for example, a torsion spring.

The upper unit 4 includes a contact portion 64 contactable with the cover 50 on the outside of the transport region in which the document P is transported. The contact portion 64 is provided with a contact surface 64a. In the state in which the upper unit 4 is closed, as illustrated in FIG. 10, the contact portion 64 comes into contact with the cover 50 so that the cover 50 is brought into the first state. When the upper unit 4 is opened from the closed state, as illustrated in FIG. 11, engagement between the contact portion 64 and the cover 50 is released and the cover 50 is switched to the second state.

Also in the present exemplary embodiment, the cover 60 is rotatably provided on the lower side of the support face 40a on which the document support portion 40 supports the document P, and switches between the first state and the second state by rotating, therefore, the cover 50 is unlikely to come into contact with the document P being fed, and it is possible to suppress inhibition of feeding of the document P.

Additionally, since the cover 60 is configured to perform state switching by the engagement with the contact portion 64 and the cancellation thereof, thus it is possible to perform the state switching of the cover 60 with simple structure.

Further, the above-described eaves portion 44 can be modified as follows. The eaves portion 44 is fixedly provided, and the eaves portion 44 easily becomes an obstacle when the document P is set on the document support portion 40. In view of this point, the exemplary embodiment illustrated in FIGS. 12 and 13 includes a rotating member 66 instead of the eaves portion 44.

A reference numeral 23 denotes a restricting portion that is a member provided at the upper unit 4, and switches between a restricting state (FIG. 12) in which downstream movement of the document P supported by the document support portion 40 in the transport direction is restricted, and a releasing state (FIG. 13) in which the restricting state is released.

Figure 13:
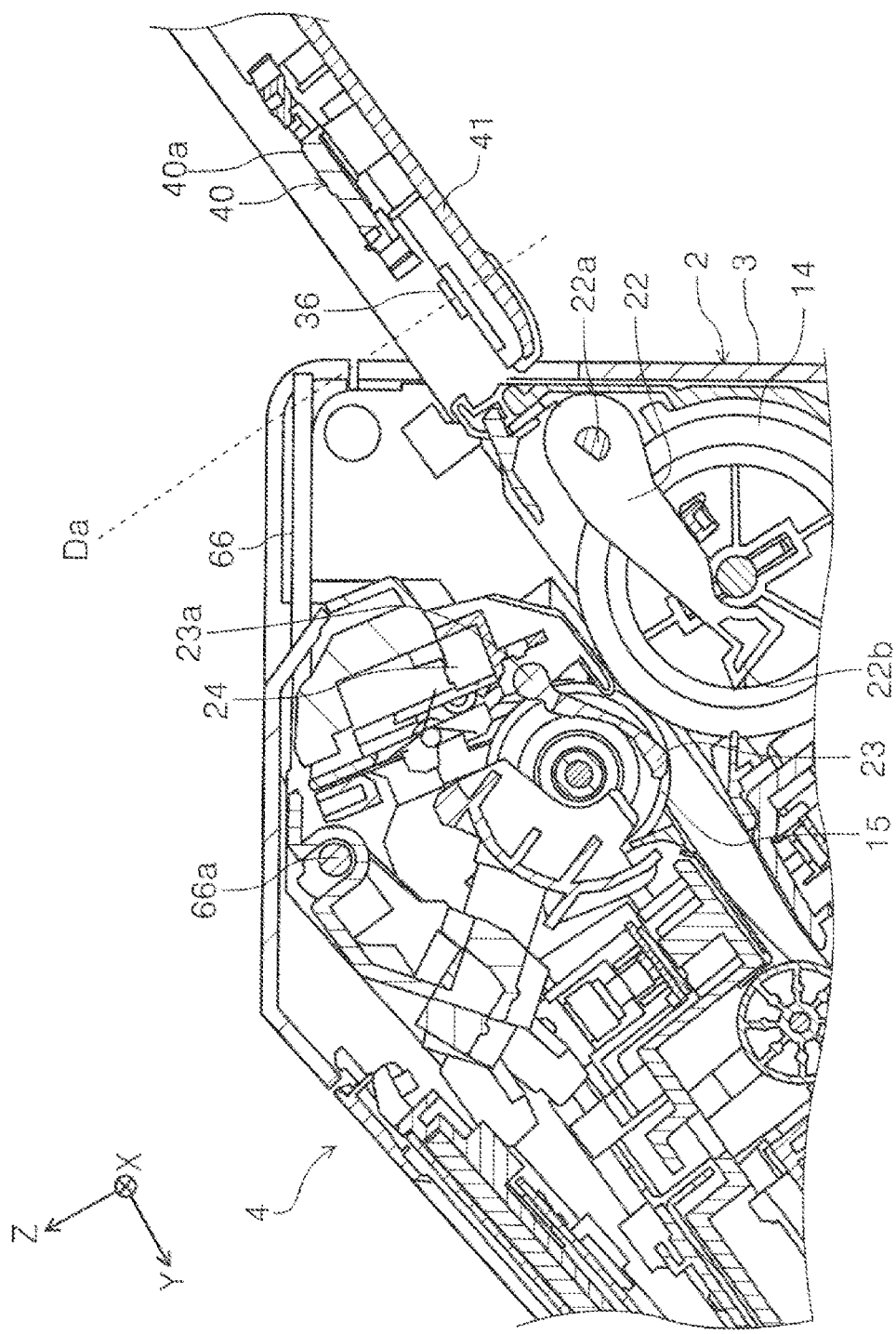
FIG. 13 is a cross-sectional view obtained by cutting the scanner according to the more another exemplary embodiment at the position where the two dimensional sensor can be seen, and is a diagram illustrating a feeding state.

The restricting portion 23 is provided so as to be rotatable with respect to a frontage restricting portion 24 via a rotary shaft 23a. The frontage restricting portion 24 is a member that restricts the number of documents P moving toward a gap between the feed roller 14 and the separation roller 15, and is provided so as to be displaceable along the Z-axis direction. The frontage restricting portion 24 is lowered as illustrated in FIG. 13 at the time of document feeding, to restrict the number of documents P moving toward to the gap between the feed roller 14 and the separation roller 15.

Figure 12:
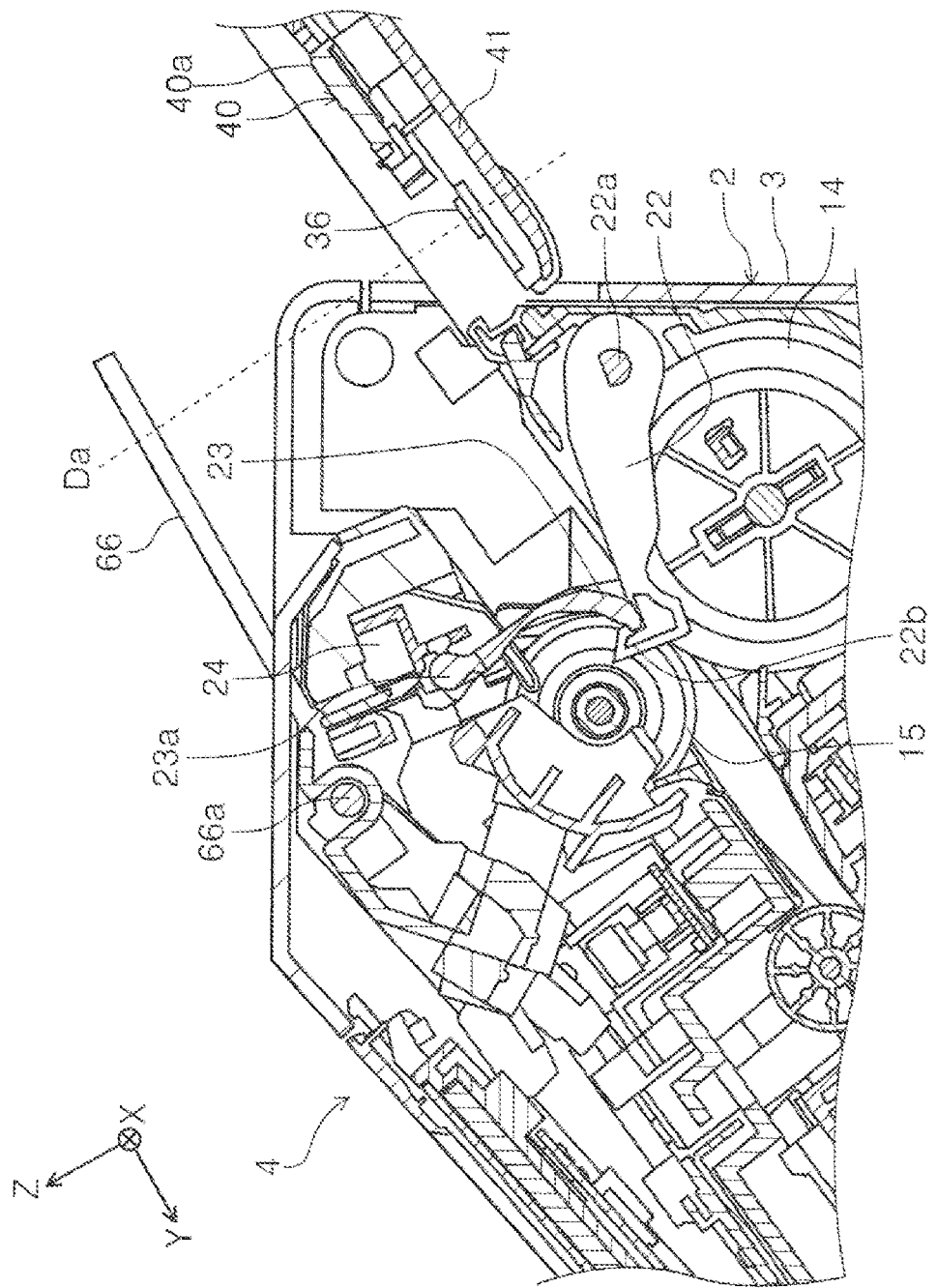
FIG. 12 is a cross-sectional view obtained by cutting a scanner according to more another exemplary embodiment at a position where a two dimensional sensor can be seen, and is a diagram illustrating a non-feeding state.

As illustrated in FIG. 12, the restricting portion 23 restricts the downstream movement of the document P supported by the document support portion 40 in the transport direction at the time of non-feeding. In this state, a lower end portion of the restricting portion 23 is engaged with a rotation restricting portion 22b formed at a set guide 22, and rotation in the clockwise direction in the figure is restricted.

The set guide 22 is provided so as to be rotatable about a rotary shaft 22a in the lower unit 3, and rotates by obtaining power from a drive source (not illustrated). As illustrated in FIG. 13, the set guide 22 takes raised posture at the time of non-feeding, and restricts the rotation of the restricting portion 23 in the clockwise direction. The frontage restricting portion 24 is pushed up in the +Z direction by the set guide 22 via the restricting portion 23.

When feeding of the document P is started from this state, the set guide 22 is driven in the counterclockwise direction. As a result, the restricting portion 23 becomes rotatable and rotates in a downstream direction as illustrated in FIG. 13 by the document P being fed. In addition, the frontage restricting portion 24 is lowered to restrict the number of documents P moving toward the gap between the feed roller 14 and the separation roller 15.

In the above configuration, the rotating member 66 provided instead of the above-described eaves portion 44 is provided so as to be rotatable about a rotary shaft 66a in the upper unit 4. At the time of non-feeding illustrated in FIG. 12, the rotating member 66 is pushed up by the frontage restricting portion 24. In this state, the optical axis Da of the two dimensional sensor 36 intersects the rotating member 66.

Then, in a feeding state illustrated in FIG. 13, the rotating member 66 is lowered. Even in this state, the optical axis Da of the two dimensional sensor 36 intersects the rotating member 66.

In this way, the rotating member 66 is rotatable in association with state switching of the restricting portion 23, and is brought into a facing state in which the rotating member 66 faces the two dimensional sensor 36 when the restricting portion 23 is in the releasing state (FIG. 13), and is brought into a separated state in which the rotating member 66 is separated from the two dimensional sensor 36 as compared to the facing state when the restricting portion 23 is in the restricting state (FIG. 12).

In this way, since the rotating member 66 faces the two dimensional sensor 36 in the facing state, it is possible to suppress, by the rotating member 66, adhesion of dust or the like to the two dimensional sensor 36. In particular, since paper dust or the like is likely to adhere to the two dimensional sensor 36 during feeding of the document P, this can be suppressed.

Then, when the restricting portion 23 is in the restricting state, that is, in the non-feeding state, since the rotating member 66 is brought into the separated state, the rotating member 66 hardly becomes an obstacle when the document P is set on the document support portion 40, and handling properties are improved.

The present disclosure is not intended to be limited to the aforementioned exemplary embodiment, and many variations are possible within the scope of the present disclosure as described in the appended claims. It goes without saying that such variations also fall within the scope of the present disclosure.

In particular, in the above-described exemplary embodiment, the scanner 1 is an aspect of a medium transport device, and the medium transport device may be a medium transport device that transports a medium in a recording device including a recording unit that performs recording on the medium, for example, an ink jet head.

What is claimed is:

1. An image reading apparatus, comprising:
   a medium transport path through which a medium is transported;
   a reader configured to read the medium on the medium transport path;
   a lower unit forming a lower side of the medium transport path; and
   an upper unit being a unit forming an upper side of the medium transport path and provided so as to be openable and closeable with respect to the lower unit, wherein
   the lower unit includes
      a medium support portion that supports the medium before being fed,
      a two dimensional sensor that is disposed so as to face the medium fed from the medium support portion and detects movement of the medium in a two dimensional coordinate system including a first axis and a second axis, and
      a cover that switches a state in conjunction with opening and closing of the upper unit, and switches between a first state in which the two dimensional sensor is exposed in a state in which the upper unit is closed and a second state in which the two dimensional sensor is covered in a state in which the upper unit is opened,
   the cover is provided so as to be slidable along a width direction intersecting a transport direction of the medium on a lower side of a support face on which the medium support portion supports the medium, slides in a first direction that is one way of the width direction to switch from the first state to the second state, and slides in a second direction that is another way of the width direction to switch from the second state to the first state,
   the lower unit includes a cam member having a cam inclined surface configured to be engaged with the cover, the cam member being formed on an outside in the width direction of a transport region in which the medium is transported and on an outside in the second direction with respect to the transport region,
   the cam member is displaceable in a direction in which the cam member moves forward and backward with respect to the upper unit in a closed state and is pressed toward the upper unit,
   the upper unit includes a push-down portion that pushes down the cam member in the closed state,
   the cover is pressed toward the second direction,
   in the state in which the upper unit is closed, the push-down portion pushes down the cam member to release the engagement between the cam inclined surface and the cover, and the cover is pressed in the second direction to be brought into the first state, and
   when the upper unit is opened from the closed state, the cam member is raised so that the cam inclined surface presses the cover in the first direction, and switches the cover to the second state.

2. The image reading apparatus according to claim 1, wherein
   the cover includes a cleaning member configured to clean a facing surface facing the medium in the two dimensional sensor, and
   the cleaning member cleans the facing surface in association with state switching of the cover.

3. An image reading apparatus, comprising:
   a medium transport path through which a medium is transported;
   a reader configured to read the medium on the medium transport path;
   a lower unit forming a lower side of the medium transport path; and
   an upper unit being a unit forming an upper side of the medium transport path and provided so as to be openable and closeable with respect to the lower unit, wherein
   the lower unit includes
      a medium support portion that supports the medium before being fed,
      a two dimensional sensor that is disposed so as to face the medium fed from the medium support portion and detects movement of the medium in a two dimensional coordinate system including a first axis and a second axis, and
      a cover that switches a state in conjunction with opening and closing of the upper unit, and switches between a first state in which the two dimensional sensor is exposed in a state in which the upper unit is closed and a second state in which the two dimensional sensor is covered in a state in which the upper unit is opened,
   the cover is rotatably provided on a lower side of a support face on which the medium support portion supports the medium, and rotates to switch between the first state and the second state, the upper unit includes, on an outside of a transport region in which the medium is transported, a contact portion contactable with the cover, the cover is pressed toward the second state in the state in which the upper unit is closed, the contact portion comes into contact with the cover to bring the cover into the first state, and when the upper unit is opened from a closed state, engagement between the contact portion and the cover is released and the cover is switched to the second state.

4. The image reading apparatus according to claim 3, wherein the cover includes a cleaning member configured to clean a facing surface facing the medium in the two dimensional sensor, and the cleaning member cleans the facing surface in association with state switching of the cover.

5. An image reading apparatus, comprising:

a medium transport path through which a medium is transported;

a reader configured to read the medium on the medium transport path;

a lower unit forming a lower side of the medium transport path; and an upper unit being a unit forming an upper side of the medium transport path and provided so as to be openable and closeable with respect to the lower unit, wherein the lower unit includes a medium support portion that supports the medium before being fed, a two dimensional sensor that is disposed so as to face the medium fed from the medium support portion and detects movement of the medium in a two dimensional coordinate system including a first axis and a second axis, and a cover that switches a state in conjunction with opening and closing of the upper unit, and switches between a first state in which the two dimensional sensor is exposed in a state in which the upper unit is closed and a second state in which the two dimensional sensor is covered in a state in which the upper unit is opened, and the upper unit includes a restricting portion that switches between a restricting state in which downstream movement in a transport direction of the medium supported by the medium support portion is restricted and a releasing state in which the restricting state is released, and a rotating member that is a member rotatable in association with state switching of the restricting portion, is brought into a facing state of facing the two dimensional sensor when the restricting portion is in the releasing state, and is brought into a separated state of being separated from the two dimensional sensor as compared to the facing state when the restricting portion is in the restricting state.

* * * * *